Figure 1:
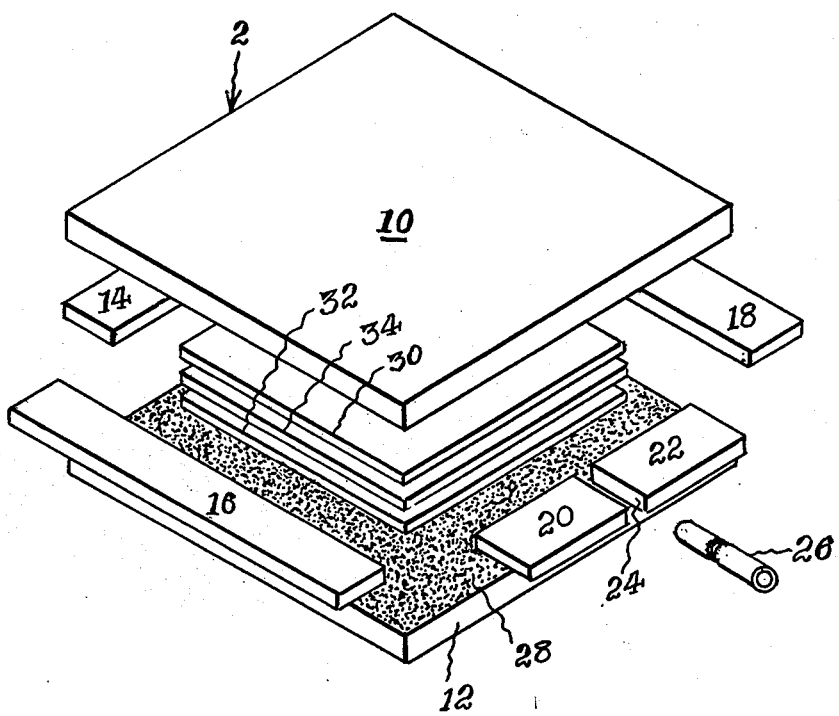

June 1, 1965 C. WRIGHT, JR 3,186,083
METHOD AND PARTING COMPOUND FOR PRODUCING
TITANIUM CLAD STAINLESS STEEL
Filed May 15, 1961 2 Sheets-Sheet 2

INVENTOR.
Charles Wright Jr.
BY
Mason, Mason + Albright
ATTORNEYS.

United States Patent Office 3,186,083
Patented June 1, 1965

3,186,083
METHOD AND PARTING COMPOUND FOR PRODUCING TITANIUM CLAD STAINLESS STEEL
Charles Wright, Jr., Coatesville, Pa., assignor to Lukens Steel Company, Coatesville, Pa., a corporation of Pennsylvania
Filed May 15, 1961, Ser. No. 109,895
7 Claims. (Cl. 29—470.9)

This invention relates to a titanium clad stainless steel having a special chemical analysis and a parting composition which is particularly adapted for use in fabricating the titanium clad strip, as well as the method of producing said strip.

This invention is a further development of the subject matter of Keay Patents Nos. 2,786,265, granted March 26, 1957, and 2,813,332, granted November 19, 1957.

An object of the invention is to provide a double titanium clad strip, the cladding material being of special chemical analysis, to be used in the production of stainless steel foil. In some cases it would be of advantage to use a single titanium clad stainless steel strip. The double titanium clad type stainless steel is reported to have been used in the manufacture of vacuum tubes, but previous attempts have been only partially successful in the roll bonding of the clad elements, while the present invention has been entirely successful, as will be hereinafter set forth.

Another object is to provide a method of producing titanium clad stainless steel strips which utilize a novel parting compound on the cover plates to prevent welding of these plates to the surfaces of the titanium clad stainless steel strip.

A further object is to provide a novel parting compound particularly adaptable in a cladding process for bonding titanium clad stainless steel strip.

Other objects will appear hereinafter throughout the specification.

Figure 2:
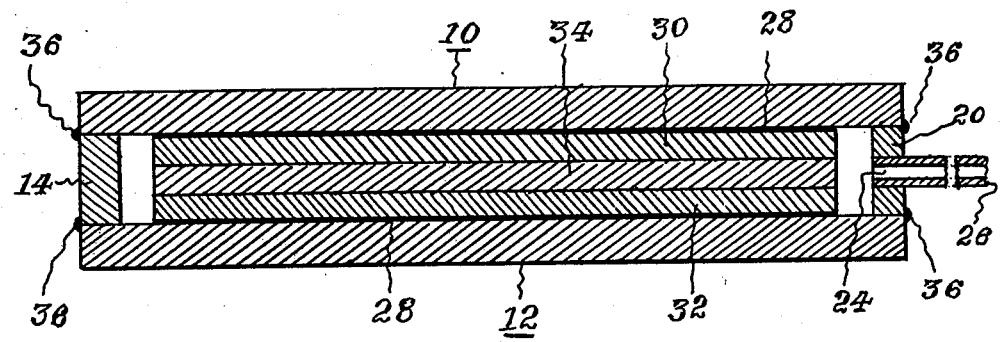

In the drawings:

FIGURE 1 is an exploded view showing the assembly of a 5-ply pack used in processing a double clad strip; and FIGURE 2 is a central vertical sectional view of the multiple pack.

The production of titanium clad stainless steel strip of 0.1 inch gage wherein the stainless steel ply forms the source of strength and the titanium ply or plies form the outer surface is fraught with many difficulties, principally when it is desired to produce such strips by pressure bonding procedures. It has been proposed to make a double 20% titanium clad type stainless steel strip of approximately 0.1 inch gage and of various widths and lengths.

I have determined that such a strip may be produced using type 405 stainless steel. The chemistry of the clad assembly components may be as follows:

I. CLADDING—COMMERCIALLY PURE TITANIUM, ASTM: B265-52T, Grade 2

| Identification | Pack No. | Ti | Nominal chemical comp., percent | | | |
|---|---|---|---|---|---|---|
| | | | N | C | Fe | W |
| Ht. #R11817 | 1 | [1] 99.2 | [2] 0.10 | [2] 0.20 | [2] 0.25 | [2] 0.02 |
| MST A-55 | 2, 3, 4 | [1] 99.2 | [2] 0.10 | [2] 0.20 | [2] 0.25 | [2] 0.02 |

[1] Minimum. [2] Maximum.

II. BACKING STEEL—TYPE 405 STAINLESS STEEL, A240-54 GRADE 0
[Chemical composition, percent]

| Heat No. | C | Mn | P | S | Si | Cr | Al |
|---|---|---|---|---|---|---|---|
| 54285 | 0.045 | 0.38 | 0.021 | 0.022 | 0.47 | 13.98 | 0.19 |

III. COVER PLATES—ASTM: A201-54T, GRADE B
[Chemical composition, percent]

| Heat No. | C | Mn | P | S | Cu | Si | Ni | Cr |
|---|---|---|---|---|---|---|---|---|
| 20580 | 0.22 | 0.49 | 0.017 | 0.035 | 0.25 | 0.25 | 0.30 | 0.08 |

Type 405 stainless steel is defined on page 620 of the Welding Handbook, Third Edition, as having the following chemistry:

*Chemical composition, percent*

| C max. | Mn max. | Si max. | P max. | S max. | Cr range | Other elements—Al |
|---|---|---|---|---|---|---|
| 0.08 | 1.00 | 1.00 | 0.04 | 0.03 | 11.50–13.00 | 0.10–0.30 |

Previous methods have been only partially successful in the development of a titanium clad foil product, particularly one of small gage that may be used in a vacuum tube. While a single titanium ply may be used, the production of such foil strips using a double titanium clad type 405 stainless steel foil is preferred. While only 0.1 inch has been mentioned as a typical gage for these double titanium clad stainless steel strips, it will be understood that strips of either greater or lesser gage may be produced, up to 3/16 of an inch or over and less than 0.1 inch.

Considerable research, of course, has resulted in technological improvements in the art which have simplified the processes of the clad packs of the prior art and have provided more consistent results. These improvements which form part of the present invention consist in (1) pressure bonding from 1700° F. with reductions in thickness of less than 2 to 1; (2) bonding surfaces of the titanium and backing material (stainless steel ply) being protected from gaseous contamination by a tight sealed vacuum arrangement; and (3) using a novel parting compound.

The preferred vehicle of the parting compound has the following characteristics:

Percent ratio $Na_2O:SiO_2$ _____ 1:3.22 (N type sodium silicate).
Concentration in water _____ 3.33 percent.

A workable range of sodium silicate (N type) in water is a 2 to 8% concentration.

The filler for the parting compound is powdered magnesium oxide capable of passing a 100 mesh screen. The concentration of magnesium oxide can vary from 1 to 2 parts by volume to 1 part by volume of prepared sodium silicate vehicle above noted.

Upon mixing the magnesium oxide wtih the vehicle, it has been found that the oxide tends to coagulate into many tiny spheres. This reaction reduces the efficiency of the parting compound and can produce a rough surface on the titanium cladding. The addition of 1% by weight of magnesium silico-fluoride to the magnesium oxide before mixing with the vehicle reduces the tendency of the MgO to coagulate thereby providing more uniform coverage and better surface qualities on the finished clad plate.

A further advantage in using the above-noted parting compound is that the parting compound may be effectively removed by a hot water bath followed by an acid pickle in 2% hydrofluoric 20% nitric acid.

Referring now to FIGURES 1 and 2 of the drawings, reference numeral 10 indicates the top cover plate and reference numeral 12 indicates the bottom cover plate. Numerals 14, 16 and 18 indicate three filler bars, and reference numerals 20 and 22 are filler bar pieces for the fourth side of the pack. When these are assembled, as shown in FIGURE 2, all sides of the pack are closed. There will be an opening 24 for the reception of pipe 26. Numeral 36 includes the usual welds for the envelope.

The facing undersides of the cover plates are coated with the parting compound indicated by reference numeral 28. The titanium inserts are indicated by numerals 30 and 32, and the stainless steel type 405 backing is shown at 34.

A 5-ply seal welded sandwich assembly was chosen as a method for providing the clad components. This method was chosen in order that the bonding surfaces of the titanium cladding and of the type 405 stainless steel backing could be protected from gaseous contamination during the heating and bonding cycles. The pack was provided so as to produce a 33% double titanium clad type 405 stainless steel strip of about 0.20″ gage, it being understood, however, that the metal gage of the titanium strips and backing strip will vary in accordance with the use intended. The invention, however, is directed primarily to the provision of a titanium clad stainless steel strip of small gage. The chemistry of the major components of the pack have been furnished above. It will be understood, however, that certain variations may be necessary, such as the chemistry of the cover plates.

The titanium strip inserts were prepared for bonding by a three-step operation. First, the strips were pickled 3 minutes in a 2% hydrofluoric acid plus 20% nitric acid solution. Second, the bonding surface of each strip was buffed with a stainless steel wire wheel. And third, the strips were repickled 2 minutes in the same acid solution. Each pickling operation was followed by a rinse in cold water and then by drying in a hot air blast.

The type 405 stainless steel backing strip was prepared for bonding in a manner similar to that noted above. However, the nitric acid concentration in the pickle bath was lowered from 20% to 10% in order to minimize the passivation of the stainless steel backing strip.

The preparation of the cover plates and filler bars prior to assembly consisted of degreasing with acetone, then descaling by a grit blasting operation.

The parting compound consisted of 10 parts magnesium oxide, 1 part magnesium silicofluoride and 11 parts sodium silicate water vehicle, the same being brushed into the facing surfaces of each cover plate, as indicated at 28 in FIGURES 1 and 2. The inclusion of the parting compound in the pack insures separation of the composite metal strip from its protective covering after the bonding cycle has been completed. The pack components were assembled as shown in FIGURE 1 and then clamped in proper position. Plastic electric tape was wrapped around the periphery to provide a partial seal for gas purging of the pack prior to seal welding.

Before assembly, the internal surface of the nickel pipe was cleansed by immersion in a hot 10% solution of trisodium phosphate, followed by an activation treatment of 5 minute immersion in concentrated hydrochloric acid. The nickel pipe vacuum connector was attached to a source of commercial grade argon, then positioned over the ¼″ opening in the filler bar. A gas flow of 10 c.f.h. was passed from the argon cylinder through the nickel tube and into the clamped pack. This flow of argon was continued while the nickel tube was welded in position using a ⅛″ Inco "A" electrode and during the seal welding operation.

Seal welding of the pack was completed with ⅛″ Chromend type 25/20 electrodes. Welding was started alternately from each side of the nickel tube and continued around the pack so that the exit for the argon gas was always ahead of the molten weld pool. The gas flow was turned off at its source as the welder completed the last half inch of welding to prevent a blowout through the molten weld metal.

After the pack was seal welded, the argon gas was again turned on and the pressure within the pack raised to 50 lbs. Defects in the weld metal were indicated by painting the weld area with a soap solution. The outflow of gas from a weld defect caused a bubbling of the soap solution thereby revealing the defect's location. All defects were repair welded and retested until the pack was gas tight.

The assembled pack was attached to a vacuum system and the pack was held under a vacuum of 4 microns' pressure for one hour, then mechanically sealed off from the system by means of a valve, not shown, such as a ¾″ Hills-McCanna diaphragm valve.

A metallurgical seal of the pack under vacuum was effected by heating the nickel pipe with a reducing gas flame to approximately 2100° F. and then dry press forging the same. The forging produced a flat extruded area of at least 1½″ long in which the opposing walls of the nickel pipe were welded together. The pack was separated from the valve by gas cutting across the center of the extruded area. In order to provide further protection from gaseous diffusion, the edge of the cut off nickel pipe attached to the pack was remelted with a reducing flame from a gas welding torch.

The sealed-off pack was heated for bonding in an electric furnace preset for 1700° F. which was at this temperature before the pack was charged. On charging, an auxiliary thermocouple was placed on the surface of the pack to determine when the pack was at temperature and to permit adjustment of the furnace controller to give a pack temperature of 1700° F.±20°. The pack was held at 1700° F. for ½ hour per inch of thickness after which it was transported to the bonding press.

A metallurgical bond was effected between the titanium inserts and the type 405 stainless steel by the heat and pressure method. The bonding temperature was approximately 1650° F. to 1675° F. as heat was lost by conduction to the cold press platen. The pressure for bonding was applied by a fast acting hydraulic press. This provided a reduction in pack gage from 1.260″ to 0.840″ or 1.5 to 1. Contact was maintained between the press platens and the pack for several minutes, after which the pack was allowed to air cool to room temperature.

The actual pressure exerted on the bond area was the applied load of approximately 2,400,000 lbs. divided by the contact area, in this case 6″ x 6″ or 36 square inches, or approximately 65,000 lbs. per square inch.

The fusion welded zones around the edges of the "as pressed" pack were cut away to allow separation of the clad strip from its protective sheath. The surfaces of the titanium cladding and cover plates were coated uniformly with the parting compound, attesting to its practicability as a separating medium for this type of pack. The surfaces of the titanium cladding were readily cleaned of parting compound by a pickling treatment of three minutes in 2% hydrofluoric—20% nitric acid solution. The surfaces of the cladding were clean and bright, although etching of the type 405 stainless backing steel was apparent.

A section of clad strip was cut from the center of the over-all clad strip and the edges of the long sides were ground to a uniform #120 grit finish to remove the burrs resulting from the saw cutting operation. Gage measurements were made along the long sides to determine the reduction and uniformity of gage of the composite strip. In all, five measurements were made along each side, i.e., one on each end, one in the center, and one two inches equidistant from the center. The gage varied from 0.120″ to 0.202″ with considerable cladding build-up at the ends. This variation was reduced to 0.120″ to 0.178″ when only the center 4-inch section was considered. According to these measurements, the composite plate was reduced variably from 1.4 to 2.1 to 1 during the bonding operation.

The edges of the strip were inspected with Dy-Chek to show the continuity of the bond. No red dye appeared in the developer, thereby showing that the edges of the clad strip were 100% bonded.

A hammer testing technique was also used to evaluate the continuity of the bond. Repeated blows over the surface of clad strip produced a metallic ring each time. This established that no gross bond discontinuities were present.

One of the test strips was cut from side scrap, one each adjacent to each side of the pattern strip. These sections were ground to a uniform #120 grit finish and subjected to a twist test to evaluate the bond strength of the composite strip. Subsequently the pattern strip was cyclic stress relieved 2 hours at 1225° F. and air cooled to evaluate the ability of the bond to withstand heat treatment. Also, test strips were cut from the heat treated section after 1, 2 and 4 cycles, ground to a uniform #120 grit finish, and subjected to a twist test.

The twist test was made by clamping test strips in a vise. The first "as pressed" clad strip was twisted with a crescent wrench until the strip sheared in two. The fracture propagated from the type 405 stainless backing and occurred in an area where a 180° turn was made over a 3/8' length of the test strip. Macroscopic examination at 30× of the fractured surface showed no separation of the titanium cladding from the type 405 stainless backing material. Subsequent twisting of the clad strips was regulated to provide a 180° turn every 3/4 inch. The twisted test strips were examined at a magnification of 30× and by Dy-Chek inspection for bond separation. The results of these tests are given in Table II. These data show the excellent ductility of the titanium type 405 stainless steel bond in the "as pressed" condition and after 4 cyclic stress relieving treatments of 1225° F. for 2 hours, following which the strips are air cooled. Table II is as follows:

*Results of twist tests on double titanium clad type 405 stainless steel*

| Pack No. | No. of stress relieving cycles [1] | Length of 180° turn | No. of turns | Remarks |
|---|---|---|---|---|
| 1 | None | 3/8" | 4 | Sheared cross section of strip. No bond separation.[2] |
| 1 | None | 3/4" | 10 | No bond separation.[2] |
|   | 1 | 3/4" | 5 | Do. |
|   | 2 | 3/4" | 5 | Do. |
|   | 4 | 3/8" | 6 | Do. |
| 2 | None | 3/4" | 5 | Do. |
|   | 1 | 3/4" | 5 | Do. |
| 3 | None | 3/4" | 5 | Do. |
|   | 1 | 3/4" | 5 | Do. |
| 4 | None | 3/4" | 5 | Do. |
|   | 1 | 3/4" | 5 | Do. |

[1] One cycle—1225° F., 2 hrs., air cool.
[2] Examined at a magnification of 30× and inspected by Dy-Chek.

Following the cladding operation, each strip was examined for continuity of the clad bond, uniformity of gage and percent cladding, hardness of the titanium, and ductility of the type 405 stainless steel bond. The latter two properties were determined in the "as-pressed" condition and after stress relieving 2 hours at 1225° F., followed by air cooling.

In order to determine the gage and percentage of cladding, thickness measurements were made of total gage and both clad layers at the four corners and center of the long sides of each of the strips that were produced. The total gage of the composite strips was measured with the aid of vernier calipers, and the thickness of the cladding layers was measured with an optical eyepiece at a magnification of 100×. The unit of measurement was the filar unit which was converted directly into percent cladding. The various gages and percent cladding of each strip may be summarized as follows:

*Table III*

| Pack No. | Variation in— | |
|---|---|---|
|  | Total gage | Percent cladding |
| 2 | .093±.004 | 19.4+1.4 / −0.8 |
| 3 | .094+.008 / −.002 | 19.7+0.4 / −0.8 |
| 4 | .097+.004 / −.003 | 19.8+0.6 / −0.4 |

Five hardness measurements were made on the surface of the titanium cladding layers in the "as-pressed" condition and after stress-relieving 2 hours at 1225° F. and air cooled. A Rockwell hardness tester with a diamond Brale indentor and a load of 60 kg. (Rockwell "A" Scale) was used to obtain the data given in Table IV, noted hereinafter. The hardness of the "as pressed" titanium cladding ranged from 54–62 Rockwell "A" and was decreased 1 to 5 points by the stress-relieving treatment.

Table IV is as follows:

*Results of hardness tests on cladding surfaces of double 20% titanium clad type 405 stainless steel strip*

| Pack No. | Condition | Hardness—Rockwell "A" | | |
|---|---|---|---|---|
|  |  | Readings | Average | Range |
| 2 | As-pressed | 59, 57, 56, 56, 57 | 57 | 56–59 |
|   | Stress-relieved | 51, 53, 53, 50, 52 | 52 | 50–53 |
| 3 | As-pressed | 54, 55, 59, 58, 57 | 56 | 55–58 |
|   | Stress-relieved | 50, 52, 54, 53, 50 | 52 | 50–54 |
| 4 | As-pressed | 54, 62, 55, 58, 59 | 57 | 54–62 |
|   | Stress-relieved | 53, 59, 55, 58, 56 | 56 | 53–59 |

The following have been attained by the present invention: (1) A double titanium clad type 405 stainless steel product can be made by pressure bonding at a temperature of 1700° F.; (2) The bonding surfaces of titanium and type 405 stainless steel can be protected by a sealed-off vacuum technique in a pack; (3) The metallurgical bond between titanium and type 405 stainless steel remains ductile after four heat treating cycles of 2 hours at 1225° F., following which the product is air cooled; and (4) A magnesium oxide-magnesia silicafluoride-sodium silicate water mixture acts as an effective parting compound in the making of the double or single titanium clad type 405 stainless steel product and is readily removed by acid pickling after the bonding operation.

The similarity between the physical and mechanical properties of the various clad strips attests to the development of a controllable process.

Other metallic oxides, such as aluminum oxide, zirconium oxide, chromium oxide, and titanium oxide, may be used as well as the magnesium oxide in the parting compound.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A process for producing a composite titanium clad product including a metal base layer of stainless steel having at least about 11.5% chromium and at least one layer of titanium cladding which comprises forming a pack of said layers, forming an inclosure for said pack by providing cover plates and filler bars, providing a parting compound of sodium silicate water vehicle, magnesium oxide and magnesium silicofluoride on the facing surfaces of said cover plates, hermetically sealing said bars and cover plates to each other, evacuating the interior of said inclosure, heating the inclosure and pack in a furnace to give a pack temperature range of between 1680° F. to 1720° F. for about one-half hour per inch of pack thickness, effecting a metallurgical bond between the titanium and backing layers by subjecting the pack to heat and pressure at a temperature of between 1650° F. to 1675° F., cooling to room temperature and removing said strip from said inclosure.

2. A process for producing a composite titanium clad product including a metal base layer of stainless steel having at least about 11.5% chromium and at least one layer of titanium cladding which comprises forming a pack of said layers, forming an inclosure for said pack by providing cover plates and filler bars, providing a parting compound of sodium silicate water vehicle, magnesium oxide and magnesium silicofluoride on the facing surfaces of said cover plates, hermetically sealing said bars and cover plates to each other, evacuating the interior of said inclosure, heating the inclosure and pack in a furnace to give a pack temperature of between 1680° F. to 1720° F. range for about one-half hour per inch of pack thickness, effecting a metallurgical bond between the titanium and backing layers by subjecting the pack to heat and pressure at a temperature of between 1650° F. to 1675° F. for substantially two minutes, cooling to room temperature and removing said strip from said inclosure.

3. A parting composition adapted for the hot pack working of a plurality of metal members in the production of titanium clad stainless steel strips comprising an aqueous vehicle having a concentration of about 2–8% sodium silicate wherein the silicate has a ratio of about $$Na_2O:SiO_2—1:3.22$$

(N type sodium silicate), powdered MgO filler wherein the volume ratio of MgO to silicate vehicle is about 1–2:1, respectively, said parting compound having about 1% by weight of magnesium silicofluoride, said silicofluoride being added to the MgO filler before mixing with the vehicle.

4. The parting composition of claim 3 wherein the said powdered magnesium oxide is of particular size capable of passing a 100 mesh screen.

5. The method of claim 1 wherein the vehicle comprises an aqueous solution having a concentration of about 2–8% sodium silicate wherein the silicate has a ratio of about $Na_2O:SiO_2$—1:3.22 (N type sodium silicate), a powdered MgO filler wherein the volume ratio of MgO to silicate vehicle is about 1–2:1 respectively, said parting compound having about 1% by weight of magnesium silicofluoride, said silicofluoride being added to the MgO filler before mixing with the vehicle.

6. The method of claim 1 wherein the pack is subjected to pressure of about 65,000 p.s.i.

7. The parting composition of claim 3 wherein the silicate concentration in water is about 3.33%.

References Cited by the Examiner
UNITED STATES PATENTS

| | | | |
|---|---|---|---|
| 1,155,427 | 10/15 | Liebmann et al. | 29—196 |
| 1,521,541 | 2/26 | Davignow | 29—196 |
| 1,956,818 | 5/34 | Acre | 29—470.5 X |
| 2,064,684 | 12/36 | Ostendorf | 29—470.9 X |
| 2,065,389 | 12/36 | Mohole | 106—84 |
| 2,323,029 | 6/43 | Goodrich | 106—84 |
| 2,473,712 | 6/49 | Kinney | 29—472.3 |
| 2,786,265 | 3/57 | Keay | 29—470.9 |
| 2,857,285 | 10/58 | Stoddard | 106—38.27 |
| 2,879,169 | 3/59 | Teicher | 106—38.27 |
| 2,992,480 | 7/61 | Spencer | 29—472.3 |
| 3,121,949 | 2/64 | Wright | 29—504 X |

JOHN F. CAMPBELL, *Primary Examiner.*

HYLAND BIZOT, *Examiner.*